(12) United States Patent
Kirkpatrick et al.

(10) Patent No.: US 9,273,731 B2
(45) Date of Patent: Mar. 1, 2016

(54) IDLER ROLL BALL BEARING ASSEMBLY AND METHOD OF MAKING

(75) Inventors: Todd W. Kirkpatrick, Winfield, AL (US); Robert H. Wheeler, Guin, AL (US)

(73) Assignee: Joy Global Conveyors Inc., Winfield, AL (US)

(*) Notice: Subject to any disclaimer, the term of this patent is extended or adjusted under 35 U.S.C. 154(b) by 2014 days.

(21) Appl. No.: 11/962,550

(22) Filed: Dec. 21, 2007

(65) Prior Publication Data

US 2008/0153683 A1 Jun. 26, 2008

Related U.S. Application Data

(60) Provisional application No. 60/871,574, filed on Dec. 22, 2006.

(51) Int. Cl.
*F16C 33/80* (2006.01)
*F16C 35/063* (2006.01)
(Continued)

(52) U.S. Cl.
CPC ............... *F16C 33/80* (2013.01); *B65G 39/09* (2013.01); *F16C 13/022* (2013.01); *F16C 19/06* (2013.01); *F16C 33/76* (2013.01); *F16C 35/06* (2013.01);
(Continued)

(58) Field of Classification Search
CPC ........ F16C 33/80; F16C 13/022; F16C 33/76; F16C 19/06; F16C 35/06; F16C 35/063; B65G 39/09; Y10T 29/4968; Y10T 29/49682; Y10T 29/49696; Y10T 29/49547; Y10T 29/49549

USPC ............ 29/898.061, 898.062, 898.07, 895.2, 29/895.21, 430; 492/12, 17; 384/903, 537, 384/559

See application file for complete search history.

(56) References Cited

U.S. PATENT DOCUMENTS 3,841,721 A * 10/1974 Coutant et al. ................ 384/546
4,049,328 A * 9/1977 Ouska et al. .................. 384/487
(Continued)

FOREIGN PATENT DOCUMENTS

GB 1147911 4/1969
GB 1524477 9/1978
(Continued)

OTHER PUBLICATIONS

Australian Patent Office Notice for Application No. 2007336784, dated Mar. 7, 2011 (3 pages).
(Continued)

*Primary Examiner* — Sarang Afzali
(74) *Attorney, Agent, or Firm* — Michael Best & Friedrich LLP

(57) ABSTRACT

An idler roll bearing assembly, made by a method, includes a shaft having a non-grooved outer surface. A shell extends about the shaft and is rotatable relative to the shaft. A rolling bearing is secured to the shaft. A roll head is secured to the rolling bearing. The roll head includes a portion preventing axial displacement of the rolling bearing. The shell is supported for the relative rotation by the roll head. A retaining sleeve is located on the shaft to prevent axial displacement of the rolling bearing. The sleeve has an interior surface in engagement with the non-grooved outer surface of the shaft. An inner diameter of the sleeve and an outer diameter of the shaft are sized such that the sleeve is secured onto the shaft by frictional interference fit and the sleeve is maintained at a position on the shaft by the frictional interference.

16 Claims, 3 Drawing Sheets

(51) Int. Cl.
  *B65G 39/09* (2006.01)
  *F16C 19/06* (2006.01)
  *F16C 33/76* (2006.01)
  *F16C 35/06* (2006.01)
  *F16C 13/02* (2006.01)

(52) U.S. Cl.
  CPC ......... *F16C 35/063* (2013.01); *Y10T 29/49547* (2015.01); *Y10T 29/49549* (2015.01); *Y10T 29/49682* (2015.01); *Y10T 29/49696* (2015.01)

(56) References Cited

U.S. PATENT DOCUMENTS

| | | | | |
|---|---|---|---|---|
| 5,971,621 | A  * | 10/1999 | Oyafuso et al. | 384/539 |
| 6,287,014 | B1 * | 9/2001 | Salla | 384/546 |
| 6,385,849 | B1 | 5/2002 | Bryant, Jr. et al. | |
| 6,641,512 | B2 * | 11/2003 | Bryant et al. | 492/16 |

FOREIGN PATENT DOCUMENTS

| | | |
|---|---|---|
| JP | 58-075216 | 5/1983 |
| JP | 5875216 U | 5/1983 |
| JP | 60-103120 | 6/1985 |
| JP | 60103120 U | 7/1985 |
| JP | 01-176619 | 7/1989 |
| WO | WO-03/009447 A2 | 7/2002 |

OTHER PUBLICATIONS

Office Action from the Australian Patent Office for Application No. 2007336784 dated Mar. 23, 2012 (2 pages).
Office Action from the Australian Patent Office for Application No. 2007336784 dated Jun. 26, 2012 (3 pages).
Great Britain Office Action, Application No. GB0902638.6, dated Jan. 11, 2011, (2 pages).
First Patent Examination Report from the Intellectual Property Office of Australia for Application No. 2012200739 dated Mar. 19, 2014 (4 pages).

* cited by examiner

US 9,273,731 B2

IDLER ROLL BALL BEARING ASSEMBLY AND METHOD OF MAKING

CROSS-REFERENCE TO RELATED APPLICATIONS

This application claims benefit of priority of Provisional Patent Application No. 60/871,574, filed Dec. 22, 2006, the entire disclosure of which is hereby incorporated herein by reference.

FIELD OF THE INVENTION

The present invention relates bearing assemblies. The present invention generally relates to idler rollers and, more particularly, to bearing assemblies for such idler rollers. In one example, the present invention relates to bearing assemblies that are used within conveyor belt systems. The conveyor belt systems may include elongate belts that circulate in loops. The bearing assemblies may be parts of the supporting structures for the belts. The conveyor belt systems may be used to carry materials in mining environments. As such, the materials may include coal or rock or the like. The environments within which the conveyor belt systems are used may be somewhat adverse to the conveyor belt systems and the components thereof, including the belts and the bearing assemblies.

BACKGROUND OF THE INVENTION

A belt of a conveyor is conventionally supported between its ends by a plurality of carriers. Each carrier typically includes a frame extending transversely to the conveyor belt and journals generally three idler rolls in an end-facing-end relationship. Generally, the intermediate idler roll is disposed in a horizontal position while the outer two idler rolls are disposed at an upwardly inclined angled relationship to a horizontal plane to give the conveyor belt a trough-like shape for the purpose of keeping a load centered on the conveyor belt.

The idler rolls typically have bearing assemblies, which are interposed between a rotating roller shell and a stationary shaft. The bearing assemblies commonly include ball bearings as the rolling elements. However, it is also known for the bearing assemblies to have tapered roller bearings as the rolling elements because the tapered roller bearings can provide twice the minimum life of ordinary ball bearings. However, tapered roller bearing elements require precise axial clearance settings. It is known to secure bearing assemblies, and particularly tapered roller bearings assemblies, with threaded assemblies and/or snap rings with compensating washers to account for manufacturing variations.

Also, it is generally known to press various bearing assemblies onto various shafts. This is a rather simple and low-cost approach. The long shaft lengths of idler rolls, however, have made press fitting roller bearing assemblies directly onto a shaft impractical because of the precise axial clearance seating required versus shaft flexibility and compressibility. As such, there is an increased problem with obtaining and maintaining axial positioning of bearing assemblies.

It is further known to machine-cut rectangular grooves into shafts for application of retaining rings to secure idler roll assemblies in proper location. As such, it is to be appreciated that several processing steps are needed. Reference is hereby made to U.S. Pat. Nos. 6,287,014 and 6,385,849, which each shown the use of ring grooves cut in shafts for retaining bearing assemblies of idler rolls.

Accordingly, there is a need for an idler bearing assembly having a different structure and thus having a different manufacturing process.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides an idler roll bearing assembly. The assembly includes a shaft that has a central axis and a cylindrical, non-grooved outer surface. A cylindrical shell extends about the shaft. The shell has an interior surface defining a hollow interior of the shell within which the shaft extends. The shell is rotatable relative to the shaft on the central axis. A rolling bearing has a plurality of rolling bearing elements, radially interior member and a radially exterior member. The rolling bearing elements are between the interior and exterior members. The rolling bearing is secured to the outer surface of the shaft at the interior member such that the interior member is secured to the shaft and the exterior member may rotate relative to the shaft on the central axis by rolling of the rolling bearing elements. The rolling bearing is located within the hollow interior of the shell. A roll head is secured rotationally to the exterior member of the rolling bearing such that the roll head is supported for rotation relative to the shaft on the central axis. The roll head includes a portion that prevents axial displacement of the rolling bearing in a first axial direction along the shaft. The roll head also is secured axially and rotationally to the shell such that the shell is supported for the relative rotation of the shell. The roll head is located within the hollow interior of the shell. A retaining sleeve is located on the shaft adjacent to the rolling bearing to prevent axial displacement of the rolling bearing in a second axial direction along the shaft. The sleeve has an interior surface in engagement with the non-grooved outer surface of the shaft. An inner diameter of the sleeve and an outer diameter of the shaft are sized such that the sleeve is secured onto the shaft by frictional interference fit and the sleeve is maintained at a position on the shaft by the frictional interference.

In accordance with another aspect, the present invention provides a method of making an idler roll bearing assembly. The method includes providing a shaft having a central axis and a cylindrical, non-grooved outer surface. A cylindrical shell is provided to extend about the shaft. The shell has an interior surface defining a hollow interior of the shell within which the shaft can extend. The shell is rotatable relative to the shaft on the central axis. The shaft is placed to extend in the hollow interior of the shell. A rolling bearing is provided having a plurality of rolling bearing elements, a radially interior member and a radially exterior member. The rolling bearing elements are between the interior and exterior members. The rolling bearing is secured to the outer surface of the shaft at the interior member such that the interior member is secured to the shaft and the exterior member may rotate relative to the shaft on the central axis by rolling of the rolling bearing elements. The rolling bearing is located within the hollow interior of the shell. A roll head is provided. The roll head includes a portion preventing axial displacement of the rolling bearing in a first axial direction along the shaft. The roll head is secured rotationally to the exterior member of the rolling bearing such that the roll head is supported for rotation relative to the shaft on the central axis. The roll head is secured axially and rotationally to the shell such that the shell is supported for the relative rotation of the shell. The roll head is located within the hollow interior of the shell. A retaining sleeve is provided. The retaining sleeve is located on the shaft adjacent to the rolling bearing to prevent axial displacement of the rolling bearing in a second axial direction along the shaft. The sleeve has an interior surface in engagement with the non-grooved outer surface of the shaft. An inner diameter of the sleeve and an outer diameter of the shaft are sized such that the sleeve is secured onto the shaft by frictional interference fit and the sleeve is maintained at a position on the shaft by the frictional interference.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
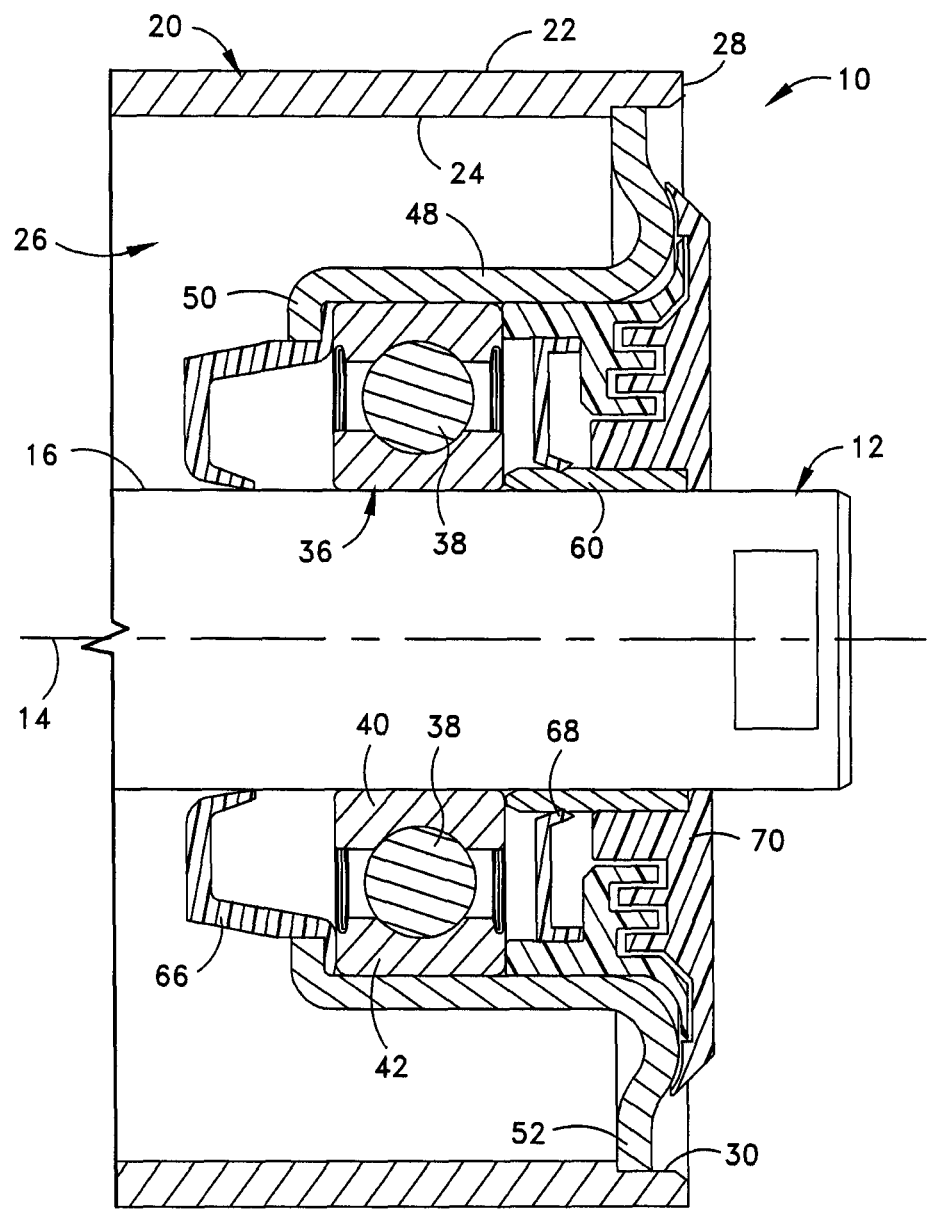
FIG. 1 is a section view of an example bearing assembly in accordance with one aspect of the present invention.
Figure 2:
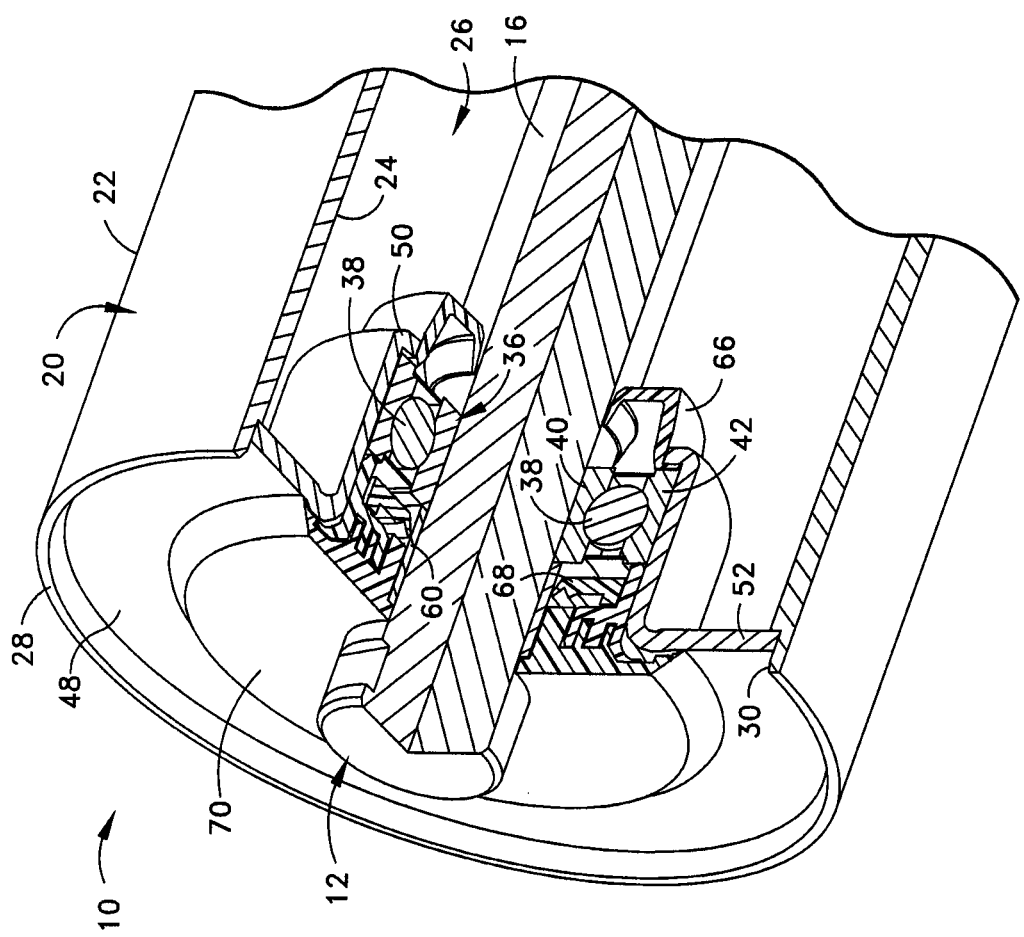
FIG. 2 is a perspective, partial section view of the example bearing assembly of FIG. 1.
Figure 3:
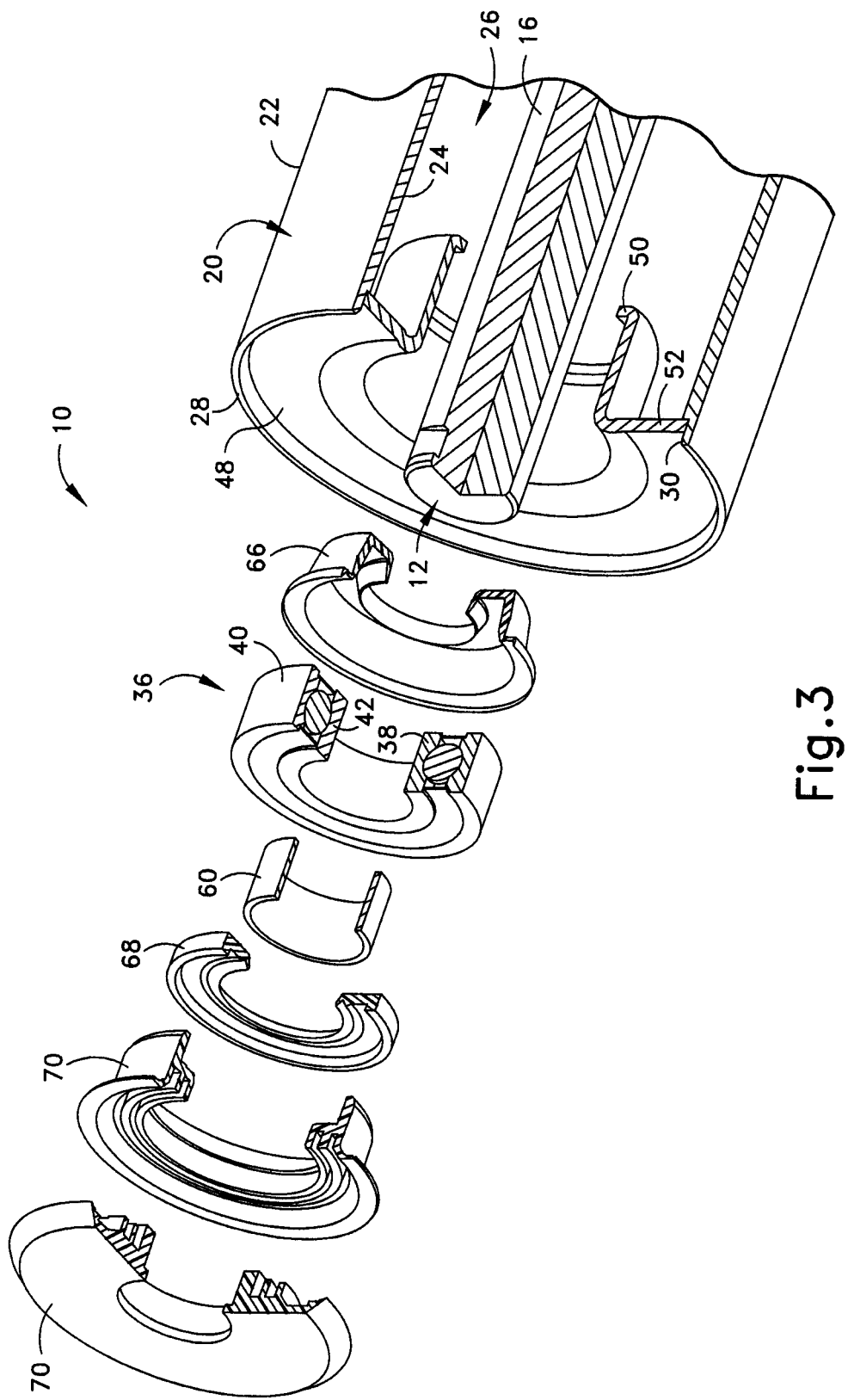
FIG. 3 is similar to FIG. 2, but shows the parts exploded.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Reference is hereby made to U.S. Pat. Nos. 6,287,014 and 6,385,849, and the content of these patents are incorporated herein by reference. As mentioned, these patents show the use of rings within ring grooves. In accordance with one aspect, the present invention eliminates the ring grooves and rings and utilizes frictional interference of a band for securing components into proper configuration.

FIG. 1 illustrates an example of an idler roll bearing assembly 10 in accordance with one example of the present invention. The example idler roll bearing assembly 10 is part of a conveyor belt system. The overall structure of the conveyor belt system is not shown because the present invention may be used within various configurations of conveyor belt systems and particular configurations of conveyor belt systems need not be a limitation on the present invention. As is understood by the person of ordinary skill in the art, the conveyor belt system includes a belt that is conventionally supported between its ends by a plurality of carriers. Each carrier within the conveyor belt system typically includes a frame extending transversely to the conveyor belt and journals generally three idler roll assemblies in an end-facing-end relationship. Generally, the intermediate idler roll is disposed in a horizontal position while the outer two idler rolls are disposed at an upwardly inclined angled relationship to a horizontal plane to give the conveyor belt a trough-like shape for the purpose of keeping a load centered on the conveyor belt. The carrier and thus the system may contain a large number of idler roll bearing assemblies 10. It is to be appreciated that just a single example will be discussed. Also, the person of skill will appreciate the structural environment of the present invention and thus further detailed description does appear to be needed.

A shaft 12 is provided and is supported at a desired location and orientation on a carrier as will be appreciated by the person of skill in the art. The shaft 12 does not rotate but is fixed relative to the carrier. (i.e., stationary) A central axis 14 extends along the length of the shaft 12. The shaft 12 may be metal.

It is to be appreciated that the shaft 12 has a cylindrical outer surface 16. As such, the shaft has a particular and uniform diameter as measured to the outer surface 16. Also, it is to be appreciated that the shaft 12 does not have any groove cut therein at the location of the idler roll bearing assembly 10. In particular the shaft does not have a groove at the location of the idler roll bearing assembly 10, and in particular there is no annular groove used to retain other components. This aspect has already been mentioned and will be discussed further herein. However, it should be noted that the shaft may have other structures (e.g., a cord notch cut at the end of the shaft), which are not part of the idler roll bearing assembly 10 and not part of a means to retain the idler roll bearing assembly components with the operative position.

The idler roll bearing assembly 10 includes a cylindrical shell 20 with an exterior surface 22 and an interior surface 24. As will be appreciated, the shell 20, and thus the exterior surface 22, is the portion of the idler roll bearing assembly 10 that engages and thus supports a conveyor belt within the conveyor belt system. The interior surface 24 of the shell 20 bounds or defines a hollow interior 26 of the shell. The bulk of the interior surface 24 can have a first diameter. At each end 28 (only one shown) of the shell 20, the interior surface may have a slightly greater diameter. This increased diameter thus provides an annular recess 30 at the end. In general, the shaft 12 extends through the hollow interior of the shell 20. It should be appreciated that the shell may have a different construction and that the interior and exterior surfaces may have diameters that vary along the axial extent. For example, the exterior surface may bulge radially outward or taper radially inwardly to a waist away from the ends. The shell is centered on the central axis 14. Moreover, as detailed further herein, the shell is supported for rotation on the central axis 14 relative to the shaft 12.

Axially, near the end 28 of the shell 20, a rolling bearing 36 is located on the shaft 12. Specifically, the rolling bearing 36 is located within the hollow interior 26 of the shell 20. The rolling bearing 36 may have any type of construction and the present rolling bearing shown and described herein is only a single example. In particular, the rolling bearing 36 may include tapered roller bearings. In general, the rolling bearing 36 has a plurality of rolling bearing elements 38, a radially interior member 40 and a radially exterior member 42. The rolling bearing elements 38 are located between the interior and exterior members 40 and 42. Thus, the interior and exterior members 40 and 42 provide a race for the plurality of rolling bearing elements 38. The rolling bearing 36 is secured to the outer surface 16 of the shaft 12 at the interior member 40 such that the interior member is secured to the shaft and the exterior member 42 may rotate relative to the shaft on the central axis 14 by rolling of the rolling bearing elements 38.

A roll head 48 of the idler roll bearing assembly 10 is secured to the exterior member 42 of the rolling bearing 36. Specifically, the roll head 48 is rotationally secured to the exterior member 42 such that the roll head 48 is supported for rotation relative to the shaft 12 on the central axis 14. The roll head has a general cup or hat shape. The securing of the roll head 48 to the exterior member 42 is via engagement between a radially interior surface of the roll head 48 and a radially exterior surface of the exterior member. The engagement may be a friction fit engagement.

The roll head 48 including a portion 50 that prevents axial displacement of the rolling bearing 36 in a first axial direction (left as viewed in FIG. 1) along the shaft 12. In the shown example, the portion 50 is a radially inwardly turned annular lip. As a reference to the description of the roll head 48 having a cup shape, the lip 50 would be at the bottom of the cup, and as a reference to the description of the roll head having a hat shape, the lip 50 would be at the top of the hat. An aperture extends through the roll head 48, as bounded by the lip 50, such that the shaft 12 extends there through.

The roll head 48 also is secured axially and rotationally to the shell 20 such that the shell is supported for the relative rotation of the shell to the shaft 12. A portion or lip 52 is engaged with the shell 20 at the recess in the interior surface 24 of the shell. The engagement may be a friction fit engagement. As a reference to the description of the roll head 48 having a cup shape, the lip 52 would be at the top of the cup, and as a reference to the description of the roll head having a hat shape, the lip 52 would be at the bottom of the hat. The recess in the interior surface 24 prevents the roll head from moving further into the shell 20. In other words, the recess prevents axial movement in the first direction (left as viewed in FIG. 1). In the shown example, the roll head 48 is located within the hollow interior 26 of the shell 20.

The idler roll bearing assembly 10 includes a retaining sleeve 60 located on the shaft 12 adjacent to the rolling bearing 36 to prevent axial displacement of the rolling bearing in a second axial direction (right as viewed in FIG. 1) along the shaft. The sleeve 60 has an interior surface 62 in engagement with the non-grooved outer surface 16 of the shaft 12. An inner diameter of the sleeve 60 and an outer diameter of the shaft 12 are sized such that the sleeve is secured onto the shaft by frictional interference fit and the sleeve is maintained at a position on the shaft by the frictional interference. Thus, there is no need to form (e.g., cut or machine) groove(s) into the sleeve and to use retaining rings within such grooves. Accordingly, cost and time required for manufacture may be reduced. In the shown example the sleeve 60 is cylindrical or band-like. The sleeve 60 may be metal.

It is to be appreciated that the shown example includes some additional structures. Some of these structures may be optional. For example, a seal 66 may be provided at a first side (left as viewed in FIG. 1) of the roller bearing 36. The seal 66 may be partially or completely flexible and may be partially or completely made with a plastic, rubber or rubber-like material. Also, the seal may be a unitary component or may be a multi component structure. The seal 66 may rest upon the shaft 12 with an annular lip and be in sealing engagement with the shaft. Also, the seal may be secured between the lip 50 and the exterior member 42 of the rolling bearing 36. A sealing engagement may be provided thereat.

Another example of additional structures is a seal 68 provided at a second side (right as viewed in FIG. 1) of the roller bearing 36. The seal 68 may be partially or completely flexible and may be partially or completely made with a plastic, rubber or rubber-like material. Also, the seal may be a unitary component or may be a multi component structure. The seal 68 may rest upon a radially outer surface of the retaining sleeve 60 at a lip of the seal and thus be in sealing engagement with the sleeve.

As yet another example of additional structure is a labyrinth seal 70. The seal 70 may be provided as a single member or two members together that provide a labyrinth passageway thought the seal. The seal 70 may be partially or completely flexible and may be partially or completely made with a plastic, rubber or rubber-like material. One specific example material may be NYLON. The seal is located on at an opening of the roll head 48. As a reference to the description of the roll head 48 having a cup shape, the opening would be at the top of the cup, and as a reference to the description of the roll head having a hat shape, the opening would be at the bottom of the hat. The seal 70 rests against the roll head 48 and against the shaft 12 and/or the retaining sleeve 60. Thus, a sealing engagement may be provided thereat. The seal 68 may rest against a portion of the labyrinth seal 70. A sealing engagement may be provided thereat.

As can be appreciated, the various possible seals provide a sealing effect to prevent contamination, etc. In view of the fact that the shaft does not have a groove, there is a common, uniform surface for contact lip seal(s) in conjunction with the retaining device. In general, such a construction provides beneficial results (e.g., generally better sealing). Also, the common, uniform surface for contact lip seal(s) in conjunction with the retaining device can result in a reduced axial length of assembled components. Still further, the common, uniform surface for contact lip seal(s) in conjunction with the retaining device can simplify, automate and speed-up an assembly process.

It is to be appreciated that generally just one axial portion (e.g., half of the idler roll bearing assembly 10 is shown and described. The person of skill on the art will appreciate that the other axial portion of the idler roll bearing assembly will have similar construction, etc.

As another aspect, the present invention provides a method of assembling the idler roll bearing assembly 10 as having the shaft 12, the shell 20 and the rolling bearing 36 interposed there between. Thus allowing the shell 20 to rotate about the stationary shaft 12. The rolling bearing 36 is placed onto the shaft 12, with the shaft not having grooves. Associated with the rolling bearing being on the shaft is a roll head 48 being placed to engage the rolling bearing and to engage the shell 20.

The retaining sleeve 60 is affixed to the shaft 12 with adequate friction fit interference to retain the sleeve on the shaft. Of course, this structure retains the roll bearing 36, the shaft 12, itself, and other components within the shell 20. Thus, the retaining sleeve 60 retains the roll bearing 36 on the shaft 12. Various seals may also be placed within the structure.

It is to be appreciated that various method steps may be used to place and affix the sleeve 60 on the shaft 12. An example of such method steps include the use of large force (e.g., much larger that force that would be experienced during use of the assembly 10) to place the sleeve 60 onto the shaft. Another example is to use a temperature differential between the shaft 12 and sleeve 60 to assist with placement of the sleeve onto the shaft. As yet another example lubricant could be used to assist placement. Such lubricant could be subsequently removed.

It is worth noting that the components, processes and methods are maintained within strict tolerance so that axial loading of the bearings and components does not exceed maximum allowable thrust load ratings for typical ball bearing elements. It is believed that international standards for shaft retention capacities due to axial force and/or impact will be met. Also, the present invention provides a proper surface for radial contact seal thus shortening the overall assembly length.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An idler roll bearing assembly including:
    a shaft having a central axis and a cylindrical, non-grooved outer surface;
    a cylindrical shell extending about the shaft, the shell having an interior surface defining a hollow interior of the shell within which the shaft extends, the shell being rotatable relative to the shaft on the central axis;
    a rolling bearing having a plurality of rolling bearing elements, a radially interior member and a radially exterior member, the rolling bearing elements being between the interior and exterior members, the rolling bearing being secured to the outer surface of the shaft at the interior member such that the interior member is secured to the shaft and the exterior member may rotate relative to the shaft on the central axis by rolling of the rolling bearing elements, the rolling bearing being located within the hollow interior of the shell;
    a roll head secured rotationally to the exterior member of the rolling bearing such that the roll head is supported for rotation relative to the shaft on the central axis such that the roll head does not contact the shaft, the roll head including a portion preventing axial displacement of the rolling bearing in a first axial direction along the shaft, the roll head also being secured axially and rotationally to the shell such that the shell is supported for the relative rotation of the shell, the roll head being located within the hollow interior of the shell; and
    a retaining sleeve located on the shaft adjacent to the rolling bearing to prevent axial displacement of the rolling bearing in a second axial direction along the shaft, the sleeve having an interior surface in engagement with the non-grooved outer surface of the shaft, an inner diameter of the sleeve and an outer diameter of the shaft being sized such that the sleeve is secured onto the shaft by frictional interference fit and the sleeve is maintained at a position on the shaft by the frictional interference, the sleeve positioned such that the sleeve does not contact the roll head,
    wherein the assembly includes at least one flexible seal member and the at least one seal member is in sealing engagement with the retaining sleeve.

2. The idler roll bearing assembly as set forth in claim 1, wherein the shaft is metal and the retaining sleeve is metal.

3. The idler roll bearing assembly as set forth in claim 1, wherein the shaft is cylindrical.

4. The idler roll bearing assembly as set forth in claim 1, wherein the portion of the roll head that prevents axial displacement of the rolling bearing in the first axial direction along the shaft is an annular lip and the rolling bearing is located within the roll head.

5. The idler roll bearing assembly as set forth in claim 1, wherein the at least one seal member is in sealing engagement with the shaft and the roll head.

6. The idler roll bearing assembly as set forth in claim 1, wherein the assembly includes a labyrinth seal.

7. The idler roll bearing assembly as set forth in claim 6, wherein the labyrinth seal is in sealing engagement with the retaining sleeve.

8. The idler roll bearing assembly as set forth in claim 6, wherein the labyrinth seal is in sealing engagement with the roll head.

9. A method of making an idler roll bearing assembly, the method including:
    providing a shaft having a central axis and a cylindrical, non-grooved outer surface;
    providing a cylindrical shell extending about the shaft, the shell having an interior surface defining a hollow interior of the shell within which the shaft can extend, the shell being rotatable relative to the shaft on the central axis;
    placing the shaft to extend in the hollow interior of the shell;
    providing a rolling bearing having a plurality of rolling bearing elements, a radially interior member and a radially exterior member, the rolling bearing elements being between the interior and exterior members;
    securing the rolling bearing to the outer surface of the shaft at the interior member such that the interior member is secured to the shaft and the exterior member may rotate relative to the shaft on the central axis by rolling of the rolling bearing elements, the rolling bearing being located within the hollow interior of the shell;
    providing a roll head, the roll head including a portion preventing axial displacement of the rolling bearing in a first axial direction along the shaft;
    securing the roll head rotationally to the exterior member of the rolling bearing such that the roll head is supported for rotation relative to the shaft on the central axis such that the roll head does not contact the shaft;
    securing the roll head axially and rotationally to the shell such that the shell is supported for the relative rotation of the shell, the roll head being located within the hollow interior of the shell;
    providing a retaining sleeve; and
    locating the retaining sleeve on the shaft adjacent to the rolling bearing to prevent axial displacement of the rolling bearing in a second axial direction along the shaft, the sleeve having an interior surface in engagement with the non-grooved outer surface of the shaft, an inner diameter of the sleeve and an outer diameter of the shaft being sized such that the sleeve is secured onto the shaft by frictional interference fit and the sleeve is maintained at a position on the shaft by the frictional interference, the sleeve positioned such that the sleeve does not contact the roll head,
    wherein the assembly includes at least one flexible seal member and the at least one seal member is in sealing engagement with the retaining sleeve.

10. The method of making as set forth in claim 9, wherein the shaft is metal and the retaining sleeve is metal.

11. The method of making as set forth in claim 9, wherein the shaft is cylindrical.

12. The method of making as set forth in claim 9, wherein the portion of the roll head that prevents axial displacement of the rolling bearing in the first axial direction along the shaft is an annular lip and the rolling bearing is located within the roll head.

13. The method of making as set forth in claim 9, wherein the at least one seal member is in sealing engagement with the shaft and the roll head.

14. The method of making as set forth in claim 9, wherein the assembly includes a labyrinth seal.

15. The method of making as set forth in claim 14, wherein the labyrinth seal is in sealing engagement with the retaining sleeve.

16. The method of making as set forth in claim 14, wherein the labyrinth seal is in sealing engagement with the roll head.

* * * * *